United States Patent [19]

Reiland

[11] Patent Number: 5,390,098
[45] Date of Patent: Feb. 14, 1995

[54] HEADLAMP ADJUSTING MECHANISM

[76] Inventor: Bernard F. Reiland, 15 Crestwood La., Rockford, Ill. 61107

[21] Appl. No.: 862,438

[22] Filed: Apr. 2, 1992

[51] Int. Cl.$^6$ .................................................. B60Q 1/04
[52] U.S. Cl. ..................................... 362/421; 362/66; 362/289; 362/428
[58] Field of Search ............... 362/61, 66, 80, 287, 362/289, 421, 424, 428, 69; 74/589, 110

[56] References Cited

U.S. PATENT DOCUMENTS

| | | | |
|---|---|---|---|
| 4,196,459 | 4/1980 | Dick | 362/66 |
| 4,333,131 | 6/1982 | Hujimoto et al. | 362/372 |
| 4,412,274 | 10/1983 | McMahan et al. | 362/269 |
| 4,412,275 | 10/1983 | McMahan | 362/269 |
| 4,674,018 | 6/1987 | Ryder et al. | 362/424 |
| 4,689,725 | 8/1987 | Saijo et al. | 362/66 |
| 4,703,399 | 10/1987 | Van Duyn et al. | 362/66 |
| 4,707,769 | 11/1987 | Van Duyn | 362/66 |
| 4,709,306 | 11/1987 | Harris et al. | 362/68 |
| 4,713,739 | 12/1987 | Ryder et al. | 362/424 |
| 4,761,717 | 8/1988 | McMahan et al. | 362/66 |
| 4,843,523 | 6/1989 | Nakamura | 362/69 |
| 4,845,598 | 7/1989 | Watanabe et al. | 362/61 |
| 4,965,706 | 10/1990 | Reiland | 362/66 |
| 5,161,877 | 11/1992 | Wright et al. | 362/421 |
| 5,186,531 | 2/1993 | Ryder et al. | 362/66 |
| 5,186,532 | 2/1993 | Ryder et al. | 362/428 |

Primary Examiner—Ira S. Lazarus
Assistant Examiner—Y. Quach
Attorney, Agent, or Firm—Laff, Whitesel, Conte & Saret

[57] ABSTRACT

A plastic housing has two halves which enclose a vertical cam which is threadedly engaged with an adjustable stud and a horizontal cam which extends beyond the housing to engage with a headlamp assembly. The vertical cam has inclined grooves which receive teeth protruding from the horizontal cam therein. Hence adjustment of the vertical stud results in linear motion of the horizontal stud. Each housing half has an inclined sidewall which engages against an inclined face of the vertical cam. By tightening the fasteners which extend through both housing halves into a fixed vehicle frame part, the housing halves are brought closer together to apply a force to the vertical cam to bring it into correct engagement of the horizontal cam. This adjustment allows slip-free adjustment of the headlamp despite variations in part dimensions of the mechanism.

14 Claims, 3 Drawing Sheets

HEADLAMP ADJUSTING MECHANISM

FIELD OF THE INVENTION

The present invention relates to angularly disposed adjustment means that are applicable to automotive equipment in general and in specific embodiments to devices for adjusting the aim of vehicular headlamps in particular.

BACKGROUND OF THE INVENTION

For safe operation all automobiles are provided with adjustable headlamps. Modern headlamp assemblies contain both high and low beam bulbs within a common housing which may be adjusted from the interior of the vehicle engine compartment. The aim of the headlamps must be periodically adjusted to ensure that the light from the vehicle headlamps is properly directed onto the vehicle path without being directed into the eyes of the driver of an oncoming vehicle.

In the interest of producing a low cost device having lubricious qualities, it is desirable to have a headlamp adjusting mechanism assembled from a few molded plastic parts. Such a mechanism is disclosed in Reiland U.S. Pat. No. 4,965,706, the disclosure of which is hereby incorporated by reference thereto. This mechanism utilizes a screw which may be rotated to elevate a vertical cam which engages with a slot in a horizontally movable cam to move the second cam and to cause the pivoting of a headlamp assembly connected thereto. Such a mechanical linkage has the advantageous property of requiring very little effort to adjust the headlamp, but being generally insensitive to movements of the headlamp which might cause the mechanism to come out of adjustment. However, for accurate adjustment it is important that the cam surfaces meet in tight engagement. Significant variations in the dimensions of the plastic parts would introduce sloppiness into the response of the mechanism or would cause the cams to lock against one another. Proper engagement is achieved by requiring strict tolerances in the production of the mechanism parts. As the manufacture of plastic parts becomes considerably more expensive if maintenance of close tolerances is required, a headlamp adjusting mechanism which operates effectively despite variations in the dimensions of its parts would be much more economically produced and would have advantageous performance properties.

SUMMARY OF THE INVENTION

The headlamp adjusting mechanism of the present invention has an injection-molded plastic front housing half and a molded plastic back housing half which is aligned with the front housing half and together with it forms a mechanism housing. The housing defines a vertical cam cavity and a horizontal cam cavity between the housing halves. A threaded vertical stud extends within the vertical cam cavity and extends outside of the housing. A vertical cam is threadedly engaged with the vertical stud within the vertical cam cavity and is adapted for vertical motion within the vertical cam cavity when the vertical stud is rotated. A horizontal cam is mounted within the horizontal cam cavity and has a vertical face which is spaced from the vertical cam. A plurality of teeth protrude from the horizontal cam vertical face. Inclined truncated-wedge shaped grooves are formed in the face of the vertical cam. The horizontal cam teeth engage within the vertical cam grooves such that vertical movement of the vertical cam results in horizontal movement of the horizontal cam. A horizontal stud extends from the horizontal cam and is connected to a vehicle headlamp assembly to adjust the orientation thereof. The front housing half has an inclined wall and the back housing half as an inclined wall which faces towards the front housing half inclined wall. The two housing half inclined walls engage against two inclined faces of the vertical cam such that when the two housing halves are brought closer together by tightening of fasteners which extend through the housing halves into a vehicle frame fixed part, the vertical cam groove is urged into engagement with the horizontal cam teeth. The geometries of the parts of the mechanism are such that slight variations in part dimensions due to manufacturing tolerances will not affect the tight engagement of the horizontal cam with the vertical cam. The mechanism is therefore accurate and substantially instantly responsive to adjustment in either direction and hence can be described as being anti-backlash.

It is an object of the present invention to provide a headlamp adjusting mechanism which allows adjustment of headlamps without slip.

It is also an object of the present invention to provide a headlamp adjusting mechanism which performs effectively despite variations in part dimensions.

It is another object of the present invention to provide a headlamp adjusting mechanism which may be economically fabricated of molded plastic parts.

Further objects, features and advantages of the invention will be apparent from the following detailed description when taken in conjunction with the accompanying drawings.

DESCRIPTION OF THE PREFERRED EMBODIMENT

Figure 1:
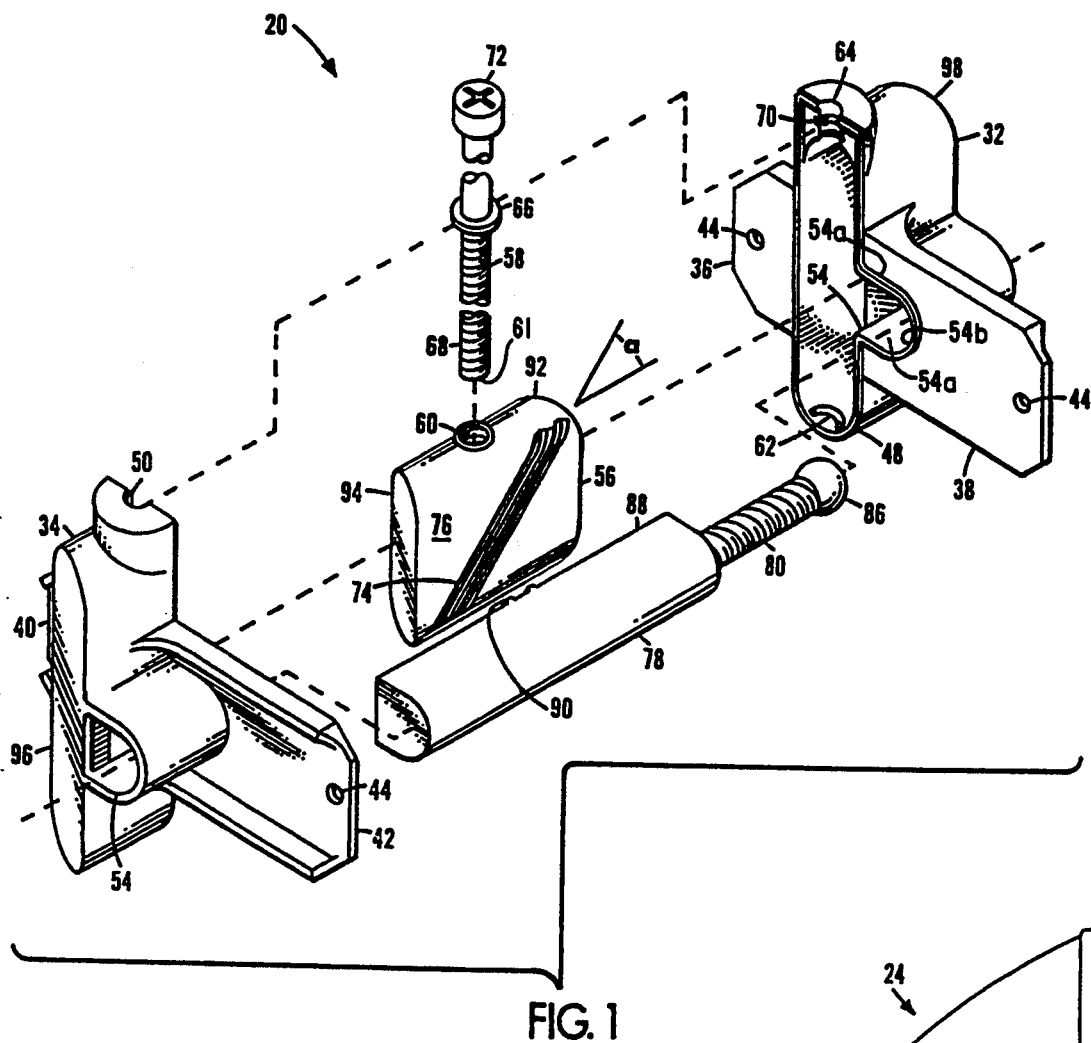
FIG. 1 is an exploded isometric view of the headlamp adjusting mechanism of the present invention.

Referring more particularly to FIGS. 1-10, wherein like numbers refer to similar parts, a headlamp adjusting mechanism 20 is shown in FIGS. 1-7. The headlamp adjusting mechanism 20 is mounted to a fixed frame part 22 of a vehicle having a vehicle headlamp assembly 24. The headlamp assembly 24 is of typical modern construction in which high and low beam replaceable bulbs are contained in a single housing adapted to be adjusted from the interior of the engine compartment. The headlamp assembly 24 may be mounted in various ways, and has been illustrated as being supported to swing upwardly and downwardly about a horizontal pivot 26 on a fixed frame part 28 of the vehicle.

The headlamp adjusting mechanism 20 is preferably assembled from injection-molded plastic parts. The geometries of the parts are such that the mechanism 20 will operate optimally even given variations in the dimensions of each part from a particular standard. This "tolerance absorption" feature permits the mechanism 20 to be manufactured utilizing less costly lower tolerance methods.

Figure 2:
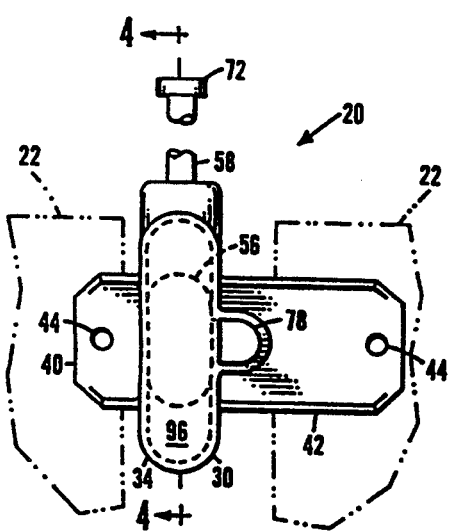
FIG. 2 is a rear elevational view of the headlamp adjusting mechanism of FIG. 1.
Figure 3:
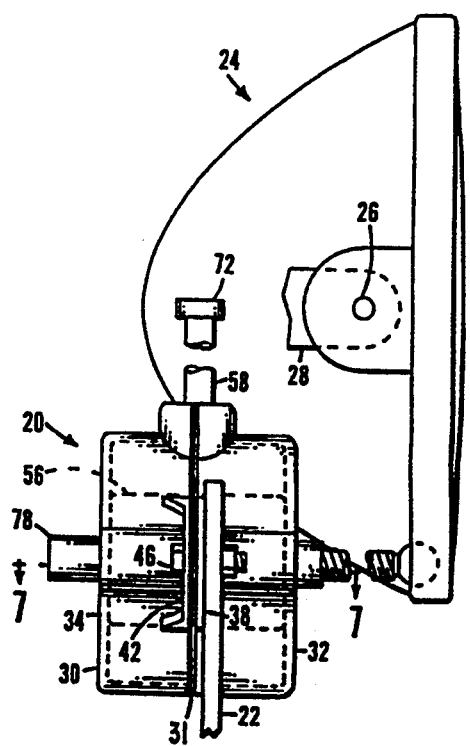
FIG. 3 is a side elevational view of the headlamp adjusting mechanism of FIG. 1.

As shown in FIG. 1, the mechanism 20 has a housing 30 composed of a front housing half 32 which faces the headlamp assembly 24 and a back housing half 34 which faces away from the headlamp assembly. The front housing half has two sidewardly extending wings 36, 38. The back housing half 34 has two sidewardly extending wings 40, 42 which correspond with and mate to the front housing half wings 36, 38. The wings 36, 38, 40, 42 have portions defining fastener holes 44 through which fasteners 46 are inserted to connect the mechanism 20 to the fixed frame part 22, as shown in FIGS. 2 and 3.

When assembled, as shown in the drawing, the two halves 32, 34 of the housing 30 define two perpendicular cavities: a vertical cam cavity 52 and a horizontal cam cavity 54.

To restrict the entry of dust, grime and other contaminants between the housing halves 32, 34 into the cavities 52, 54, one half of the housing 30 is provided with a rim or rib 48 and the opposing one half is provided with a groove 50 with which the rim engages. In the headlamp adjusting mechanism 20, the front housing half 32 has a rim or rib 48 which extends rearwardly from the housing half 32 to generally encircle the vertical and horizontal cam cavities 52, 54. A groove 50 is provided in the back housing half 34 which corresponds to and engages with the rim 48 to form a seal surrounding the cavities 52, 54.

A vertical cam 56 is enclosed within the housing halves 32, 34 and is moved vertically within the vertical cam cavity 52 by a threaded vertical stud 58 which is screwed into a threaded bore 60 which extends vertically through the vertical cam 56. The free end 61 of vertical stud 58 engages with a bearing 62 formed at the base of the vertical cam cavity 52 by the two halves of the housing 30. The opposite end of vertical stud 58 extends through a cylindrical opening 64 in a reinforcement hub 63 integral with the top of the mechanism 20. The vertical stud 58 has a cylindrical flange 66 axially spaced between the threaded portion 68 and the opposite end of the vertical stud 58. The flange 66 engages within semicircular slots 70 formed by hub 63 segments on the front and back housing halves 32, 34 and surrounding the vertical stud opening 64. The threads 68 of vertical stud 58 are engaged with the vertical cam 56 with an interference fit to ensure against turning of the stud 58 except when the stud is manually adjusted. The stud 58 is provided with a Phillips(198 ) recessed head 72 for convenient adjustment.

The vertical cam 56 has two grooves 74 recessed beneath the face 76 which is adjacent the horizontal cam 78. The grooves extend across the face 76 at an angle a, shown in FIG. 1, which may be from 25° to 50° depending upon the travel length required. Tests have shown angles of 45°, 30°, and 25°, provide effective performance.

Figure 7:
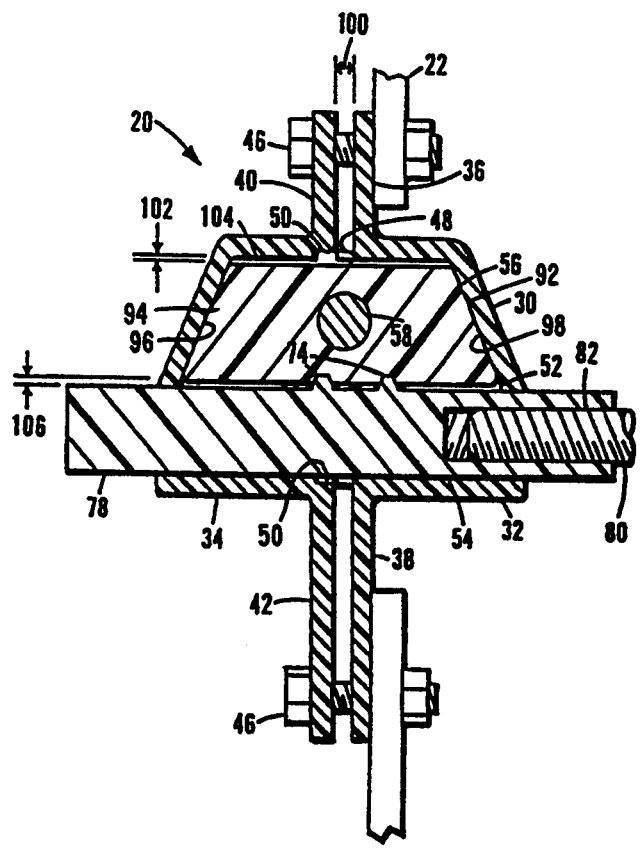
FIG. 7 is a cross-sectional view of the headlamp adjusting mechanism of FIG. 3 taken along section line 7—7.

The horizontal cam 78 travels through the horizontal cam cavity 54 formed within the housing 30. In this embodiment, cavity 54 in cross-section includes a pair of spaced parallel generally flat horizontal surfaces 54a interconnected at one end by a curvilinear cavity root surface 54b and open at their opposite ends to communicate with the vertical cavity. A threaded horizontal stud 80 is screwed into a threaded bore 82 in one end of the horizontal cam 78 as best seen in FIG. 7. The horizontal stud 80 extends through the front opening in the front housing half 32. The horizontal stud 80 has a generally spherical head 86 which engages with the headlamp assembly 24 as shown in FIG. 3.

The horizontal cam 78 has a cross-sectional configuration complimentary to cavity 54 and includes a vertically disposed flat planar face 88 which, in assembled relation to vertical cam 56, is spaced from and generally parallel to the face 76 of the vertical cam 56. Two inclined teeth 90 protrude from the vertical face 88 of the horizontal cam 78. The teeth 90 are inclined from the horizontal at the same angle as the grooves 74 in the vertical cam 56. Both the grooves 74 and the teeth 90 are complimentarily tapered and have generally the geometry of truncated wedge. The horizontal cam 78, due to its complimentary non-cylindrical profile is retained within cavity 54 with its planar face 88 in a vertical orientation throughout the horizontal travel of the cam 78.

Figure 4:
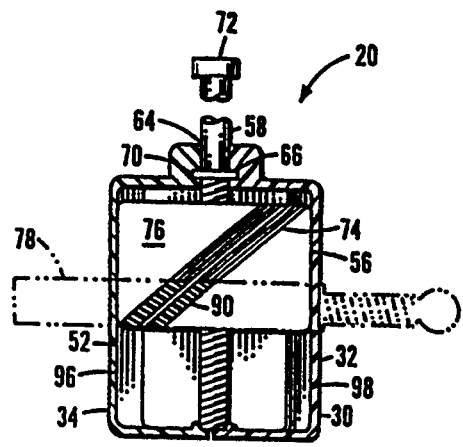
FIG. 4 is a cross-sectional view of the headlamp adjusting mechanism of FIG. 2 taken along section line 4—4 showing the vertical cam and the engaged horizontal cam in phantom view.
Figure 5:
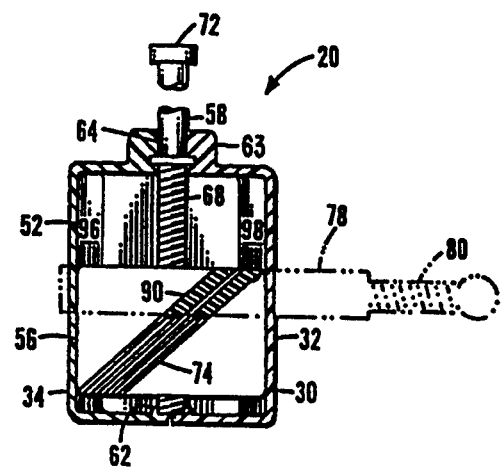
FIG. 5 is a cross-sectional view of the headlamp adjusting mechanism of FIG. 2 taken along section line 4—4 showing the vertical cam at a position lowered from that in FIG. 4.
Figure 6:
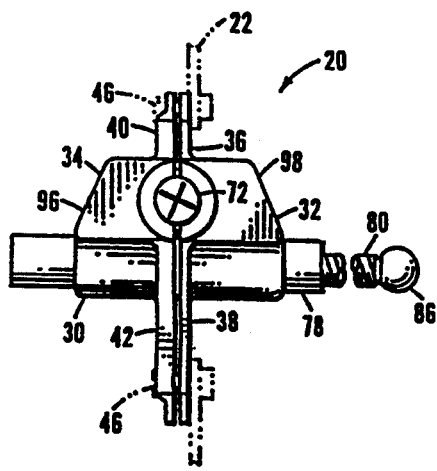
FIG. 6 is a top plan view of the headlamp adjusting mechanism of FIG. 1.

The teeth 90 of the horizontal cam are engaged within the inclined grooves 74 of the vertical cam 56. Thus, as shown in FIGS. 4 and 5, rotation of the threaded vertical stud 58 causes the vertical cam 56 to move vertically. This vertical cam movement results in the horizontal motion of the engaged horizontal cam 78. The horizontal stud 80 which is attached to the horizontal cam 78 is thus caused to travel towards or away from fixed frame part 22 causing the headlamp assembly 24 to pivot about the horizontal pivot 26 mounted on fixed frame part 28.

For accurate adjustment of the headlight assembly 24 it is important that the engagement between the vertical cam 56 and the horizontal cam 78 be tight without significant play. If the engagement is not tight there will be backlash and there will not be a direct and immediate correspondence between rotation of the vertical stud 58 and advancement or retraction of the horizontal stud 80.

The mechanism is adapted to resist any tendencies of the cams to move out of adjustment due to the vibrations in the vehicle as the result of road travel.

As best shown in FIG. 7, there are regions of the mechanism 20 where variations in the dimensions of the mechanism parts would tend to result in too loose or too tight an engagement between the cams 56, 78. If the engagement is too tight there will be a binding between the cams and no movement of the cams with respect to one another will be possible.

Proper engagement will result when the grooves 74 in the vertical cam 56 precisely match against the teeth 90 of the horizontal cam 78. This precise matching is achieved in the mechanism 20 by the geometry of the vertical cam 56 and the housing halves 32, 34.

The vertical cam 56 has a front face 92 and a rear face 94 on either side of the threaded bore 60 which are inclined towards one another. The back housing half 34 has a rear wall 96 which is inclined from a vertical plane at an angle which corresponds to the inclination of the rear face 94 of the vertical cam. The front housing half 32 also has a inclined front wall 98 which is inclined at a angle from a vertical plane substantially equivalent to the inclination of the front face 92 of the vertical cam.

The housing halves 32, 34 are dimensioned such that for the tolerance range of the vertical cam 56 and the housing halves 32, 34 a gap 100 will exist between the two attached housing halves. A gap 102 is provided between the wall 104 of the vertical cam 56 which faces away from the horizontal cam 78 and the housing halves 32, 34. A third gap 106 exists between the groove face 76 of the vertical cam 56 and the vertical face 88 of the horizontal cam 78. The width of the gaps 100, 102, 106 will vary depending on the variations in dimensions of the individual parts of the mechanism 20. These part dimension variations result from common variances or permitted tolerances in dimensions in conventionally molded articles.

The vertical cam 56 engages with the housing 30 in two regions only. The rear wall of the back housing half 96 and the front wall of the front housing half 98 engage against the rear face 94 and front face 92 respectively of the vertical cam 56. The two housing halves 32, 34 are connected to each other by the fasteners 46 which pass through the fastener holes 44 in the wings 36, 38, 40, 42 and are engaged with the fixed frame part 22. By adjusting the tightness of the fasteners 46, the back housing half 34 is brought into closer proximity to the front housing half 32. As the two housing halves 32, 34 are brought closer together the inclined walls 96, 98 engage against the inclined faces 94, 92 of the vertical cam 56 and cause the vertical cam to move towards the horizontal cam 78. This motion of the vertical cam 56 is brought short by engaging contact of the teeth 90 of the horizontal cam 78 with the grooves 74 of the vertical cam 56. If, for example, the distance between the inclined faces 92, 94 of the vertical cam 56 is somewhat enlarged, the fasteners 46 will be tightened less and the gap 100 will be greater than if the distance between the faces 92, 94 were less. In similar ways, the mechanism 20 provides for dimension variations in the housing halves 32, 34 and the horizontal cam 78.

The wedge-shaped teeth 90 and grooves 74 of the cams 56, 78 56, also serve to absorb any variations in dimension of the cams. If the teeth 90 are slightly larger than the norm, or if the grooves 74 are narrower than the norm, the teeth will still engage securely against the grooves, although not as deeply within the grooves as if the teeth were narrower than the norm and the grooves were wider. Nonetheless, for the full range of acceptable part tolerances, the vertical cam 56 and the horizontal cam 78 may be effectively engaged with one another.

The vertical cam 56 is thus always in sufficiently tight engagement with the horizontal cam 78 to allow precise adjustment of the horizontal stud 80 and hence the headlamp assembly 24 without looseness or slip and no backlash.

The horizontal stud 80 may be positioned in the horizontal cam 78 bore 82 when the mechanism is installed to provide for the correct initial positioning of the headlamp assembly 24.

Figure 8:
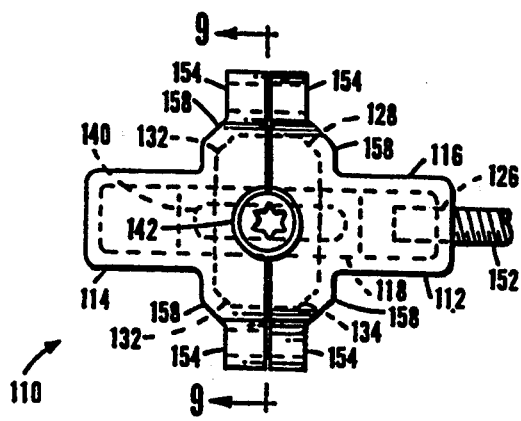
FIG. 8 is a top plan view of an alternative embodiment of the headlamp adjusting mechanism of this invention.
Figure 9:
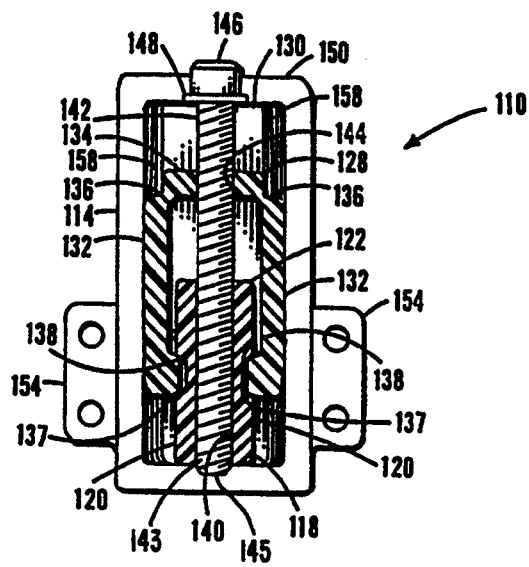
FIG. 9 is a cross-sectional view of the headlamp adjusting mechanism of FIG. 8 taken along section line 9—9.
Figure 10:
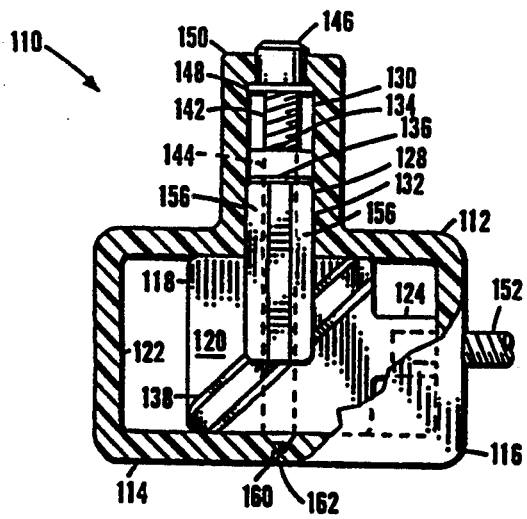
FIG. 10 is a side-elevational view of the headlamp adjusting mechanism of FIG. 8 partially broken away.

An alternative embodiment of the headlamp adjusting mechanism of this invention also incorporating tolerance absorption features is shown in FIGS. 8–10. The headlamp adjusting mechanism 110 has a front housing half 112 and a rear housing half 114 which form the mechanism housing 116. A generally rectangular horizontal cam 118 with parallel side walls 120 is contained within a horizontal cam cavity 122 formed by the housing halves 112, 114 and is movable in a front-to-back direction. The horizontal cam 118 has an integral tongue 124 which extends frontwardly through an opening 126 in the front housing half 112. A vertical cam 128 is mounted for vertical travel within a vertical cam cavity 130 formed by the front and rear housing halves 112, 114.

The vertical cam 128 has two laterally spaced arms 132 which are connected by a bridge 134. Where the arms 132 join the bridge 134 the material is of reduced thickness to form setbacks 136. The arms 132 are thus somewhat flexible with respect to the bridge 134. The base of each arm 132 has a protruding tooth 137 which extends from the arm 132 towards the other arm. The teeth 137 are inclined and are adapted to engage within inclined slots 138 formed in each side wall 120 of the horizontal cam 118. The slots 138 are inclined at an angle between 20° and 50° depending on the length of horizontal cam travel required for a particular application. The teeth 137 and the slots 138, as shown in FIG. 9, have complimentary profiles similar to a truncated wedge. This wedged engagement between the teeth 137 and slots 138 ensures a tight fit between the vertical cam 128 and horizontal cam 118. A vertically oriented through slot 140 extends vertically through the horizontal cam 118 and provides clearance for a threaded vertical stud 142 which extends through the housing 116 and which is threaded in an interference fit with a threaded bore 144 located on the bridge 134 between the arms 132 of the vertical cam 128. The vertical stud 142 has a tool engageable recessed head 146 for rotational adjustment of the stud and has a flange 148 which engages with the top 150 of the housing 116 while the opposite end 143 of stud 142 is located within a cavity 145 in the bottom walls of housing halves 112, 114, as best seen in FIG. 9, and thereby axially restrained. The horizontal stud 152 is threadedly engaged with the tongue 124 and protrudes beyond the opening 126 and is connected to a headlamp assembly (not shown).

The housing halves 112, 114 have sidewardly extending wings 154 through which a plurality of fasteners (not shown) may be inserted to connect the mechanism 110 to a fixed frame part of an automobile.

Each arm 132 of the vertical cam 128, as shown in FIGS. 8, 9 and 10, has two inclined vertical contact surfaces 156. The front and rear housing halves 112, 114 have side walls 158 which are inclined at approximately the same angle as the contact surfaces 156 on each end of the vertical cam 128. As in the mechanism 20, the headlamp adjusting mechanism 110 has a gap 160 between the housing halves 112, 114 which is covered by a rim 162. When the two housing halves 112, 114 are brought closer together by tightening fasteners extending through the wings 154, the housing sidewalls 158 engage against the contact surfaces 156 of the vertical cam 128, producing a resultant force which pushes the arms 132 of the cam into correct engagement with the slots 138 of the horizontal cam 118. The mechanism 110 may thus ensure proper engagement between the cams despite slight tolerance variations in dimensions of the mechanism parts.

By rotating the vertical stud 142 the position of the horizontal stud 152 and hence the orientation of an attached headlamp assembly may be precisely controlled without slip or backlash.

Alternatively, one half of the mechanism housing may be formed intregrally with the fixed frame part to which the mechanism is attached. In such an embodiment the housing half which is formed integrally with the frame part will preferably be formed of metal. This embodiment in particular applications may provide reduced overall manufacturing and installation costs.

The plastic parts of the mechanism 20 may be formed of any suitable plastic material but are preferably formed of Delrin ® plastic manufactured by duPont, or ABC plastic with impregnated fiber. Some types of metal or fiberglass may also be acceptable. The tolerance to be accommodated in these plastic parts will typically be within the range of variances of 0.002 inches.

It should be noted that in applications where it is desired to adjust a connected automotive part such as a headlamp assembly about two or more pivot axes, a plurality of adjusting mechanisms may be provided— one for each axis.

It is understood that the invention is not confined to the particular construction and arrangement of parts herein illustrated and described, but embraces all such modified forms thereof as come within the scope of the following claims.

I claim:

1. A headlamp adjusting mechanism comprising:
   a) a front housing half;
   b) a back housing half, which together with said front housing half defines a housing;
   c) a vertical cam extending between said housing halves, wherein said housing halves have portions defining a vertical cam cavity adapted to allow the vertical movement of said vertical cam and
   d) a horizontal cam connected to a vehicle head lamp assembly via a horizontal stud for adjustment thereof;
   d) said horizontal cam engaged against said vertical cam and extending within said housing, wherein portions of said housing define a horizontal cam cavity adapted to allow the horizontal movement of said horizontal cam;
   e) an axially restrained vertical stud threadedly engaged with said vertical cam and extending outside said housing, such that rotation of said axially restrained vertical stud results in vertical displacement of said vertical cam;
   f) portions of said vertical cam defining two faces which are inclined towards one another;
   g) said front housing half defining an inclined front wall which engages against one of said inclined vertical cam faces;
   h) said back housing half defining an inclined back wall which engages another of said inclined vertical cam faces, such that when said front housing half is brought closer to said back housing half, said inclined housing walls are engaged against said inclined vertical cam faces to urge said vertical cam into tight engagement with said horizontal cam such that vertical movement of said vertical cam results in horizontal movement of said horizontal cam without backlash.

2. The mechanism of claim 1 further including wings which extend from either side of each housing half, each wing having at least one fastener hole, and the at least one fastener hole on each side of the housing are aligned with one another and a plurality of fasteners extend through a plurality of said at least one fastener holes and a fixed vehicle frame part having a plurality of complimentary apertures adapted to accept said fasteners, such that when the fasteners are tightened against the frame part, the two housing halves are drawn together and said vertical cam is forced into tight engagement with said horizontal cam.

3. The mechanism of claim 1 further including at least one inclined groove defined by portions of said vertical cam and at least one inclined tooth extending from said horizontal cam, wherein said horizontal cam is engaged with said vertical cam by the engagement of said at least one tooth within said at least one inclined groove.

4. The mechanism of claim 3 wherein the vertical cam groove and the horizontal cam tooth have profiles of truncated wedges, such that the tooth may be securely engaged against the groove.

5. The mechanism of claim 1 further including a substantially continuous rim which extends from one housing half and a substantially continuous complimentary groove defined by portions of the other housing half, said rim engaging said groove when said housing halves are in juxtaposition, whereby said rim and said groove provide a seal against the entry of foreign matter into said vertical and horizontal cam cavities within said housing.

6. The mechanism of claim 1 wherein said vertical cam has two vertical arms which depend from a horizontal bridge member and wherein said horizontal cam is positioned between said two arms and has two sides with each side defining at least one inclined slot, and wherein each said arm has at least one tooth which engages within at least one inclined slot of said horizontal cam.

7. An angularly disposed adjusting mechanism including
   a) a front housing half;
   b) a back housing half aligned with and connecting to said front housing half to define both a vertical cam cavity and a horizontal cam cavity between the juxtaposed housing halves;
   c) a rotatable axially restrained vertical stud extending within said vertical cam cavity and extending outside of said housing halves;
   d) a vertical cam threadedly engaged with said vertical stud within said vertical cam cavity, and adapted for vertical motion within said vertical cam cavity when said vertical stud is rotated;
   e) a horizontal cam mounted within said horizontal cam cavity, said horizontal cam having a vertical face which is spaced from said vertical cam wherein said horizontal cam is connected to an automotive head lamp via a horizontal stud for adjustment thereof;
   f) at least one protruding inclined tooth extending from said horizontal cam vertical face;
   g) portions of said vertical cam define at least one inclined groove facing said horizontal cam, wherein said horizontal cam tooth is engaged within said vertical cam groove, such that vertical movement of said vertical cam results in horizontal movement of said horizontal cam;

h) a portion of said front housing half defining an inclined wall;

i) a portion of said back housing half defining an inclined wall inclined towards said front housing half inclined wall; and j) portions of said vertical cam defining two inclined faces, said faces inclined at approximately the same angle as said housing halves inclined walls, such that when said housing halves are brought closer together said horizontal cam tooth is urged into intimate engagement with said vertical cam groove.

8. The mechanism of claim 7 further including wings which extend from either side of each said housing half, each said wing having at least one fastener hole, and said at least one fastener holes on each side of said housing are aligned with one another and a plurality of fasteners extend through said fasteners holes and additionally extend through boles located in a fixed frame part, such that when said fasteners are tightened against said frame part, said two housing halves are drawn together and said vertical cam is forced into tight engagement with said horizontal cam by virtue of interaction between said inclined walls and said inclined faces.

9. The mechanism of claim 7 wherein said vertical cam groove and said horizontal cam tooth each have profiles of truncated wedges, such that said tooth may be securely engaged against said groove.

10. The mechanism of claim 7 further including a rim which extends from one said housing half and which engages with a groove defined by portion of said other housing half, said rim providing a seal against the entry of foreign matter into said vertical and horizontal cam cavities within said housing.

11. An angularly disposed motion transmitting device including vertically disposed cam means, a horizontally disposed cam means, one of said cam means having a substantially planar face confronting a planar face of another said cam means, mutually cooperating activating means connected to said vertically and horizontally disposed cam means respectively and extending between said planar faces, said device further including a housing having a pair of angularly disposed intersecting and communicating chambers for accommodating said vertically and horizontally disposed cam means in juxtaposed confronting relation, means for inducing vertical movement in said vertically disposed cam means, whereby vertical movement of said vertical disposed cam means causes said mutually cooperating activating means to produce horizontal movement in said horizontally disposed cam means, and positive means for inducing tight juxtaposed relation between said cam means, said positive means including a portion of said housing and at least one of said cam means including cooperating angled walls and surfaces respectively for forcing said at least one cam means into tighter juxtaposition with the other said cam means.

12. A motion transmitting device as claimed in claim 11 wherein said housing is provided with openings communicating with each of said chambers, the said chamber accepting said vertically disposed cam means adapted to coaxially accept a rotational axially restrained screw means, said screw means cooperatively accepted by said vertically disposed cam means whereby rotation of said screw means results in vertical movement of said vertically disposed cam means.

13. A motion transmitting device as claimed in claim 12 wherein said horizontally disposed cam means includes a bore means adapted to accept an adjustable screw means that will project through said opening communicating with said horizontal chamber whereby movement of said horizontal cam means results in a horizontal motion force capable of being transmitted to an external mechanism.

14. A motion transmitting device as claimed in claim 13 wherein said housing means includes two parts capable of being sealingly assembled, each said part including laterally extending flange means having at least one aperture, fastener means acceptable in said flange means apertures and in support means to bring said two parts together securely with said angled walls and said at least one angled cam surfaces aggressively causing said vertically disposed cam means into engagement with said horizontally disposed cam means, said housing and said horizontally disposed cam means having mating surfaces that restrain said horizontally disposed cam means against the pressure induced by said vertically disposed cam means and said angled walls of said housing.

* * * * *